United States Patent [19]
Townsend

[11] Patent Number: 6,129,403
[45] Date of Patent: Oct. 10, 2000

[54] FOLDING MOTOR VEHICLE ENTRY SEAT FOR PERSONS WHO USE WHEELCHAIRS AND OTHERS WHO HAVE PHYSICAL LIMITATIONS

[76] Inventor: Steven J. Townsend, 869 E. Romona Ave., Salt Lake City, Utah 84105

[21] Appl. No.: 09/358,441

[22] Filed: Jul. 21, 1999

[51] Int. Cl.$^7$ ................................................. B60N 2/00
[52] U.S. Cl. .................................. 296/65.01; 296/65.03; 296/65.04
[58] Field of Search ............................. 296/65.01, 65.03, 296/65.04

[56] References Cited

U.S. PATENT DOCUMENTS 3,469,880   9/1969   Woodward .
5,435,614   7/1995   Norberg ................................. 296/65.1

Primary Examiner—Dennis H. Pedder
Assistant Examiner—Mickki D. Murray
Attorney, Agent, or Firm—Mallinckrodt & Mallinckrodt

[57] ABSTRACT

A folding seat for assisting persons who use wheelchairs and other persons with physical limitations to enter and exit motor vehicles. The seat includes a frame which fits adjacent a vehicle seat at a doorway of the vehicle and which attaches to the existing bracketry holding the vehicle seat to the vehicle body. A transfer seat is pivotally connected longitudinal of the vehicle and vertically slidably connected at an edge thereof to respective slots in a pair of spaced apart upright posts of the frame. The seat is supported in a horizontal deployed position with the pivotal connection thereof at the top of the respective slots by means of an upper cross member of the frame and by a folding brace member which extends from the underside of the seat to the lower doorway portion of the vehicle body. The seat includes a stowed position wherein the seat is tilted to a vertical position and lowered such that the pivotal connections are at the lower end of the respective slots, the seat being retained laterally between the upper cross member and the side of the vehicle seat. When stowed, the seat plate extends no higher than the height of the upright posts, the top of which posts are approximately at the height of the top surface of the vehicle seat.

20 Claims, 3 Drawing Sheets

FOLDING MOTOR VEHICLE ENTRY SEAT FOR PERSONS WHO USE WHEELCHAIRS AND OTHERS WHO HAVE PHYSICAL LIMITATIONS

BACKGROUND OF THE INVENTION

1. Field

The invention is in the field of devices for assisting persons who have difficulty entering and exiting motor vehicles due to the use of a wheelchair or otherwise due to their physical limitations, and more specifically to vehicle access devices that mount within the space between the door and seat of such motor vehicles.

2. State of the Art

Various devices are available for assisting handicapped persons who utilize wheelchairs to enter and exit motor vehicles. For example, specially modified vans having elevator lifts mounted in the doorway thereof have been used for years. Such lifts typically include a ramp upon which the entire wheelchair with person is wheeled which lifts by means of a pair of hydraulic cylinders mounted at opposite sides thereof and to the outer frame of the doorway. The hydraulic power to operate the hydraulic cylinders comes from a hydraulic pump mounted to the vehicle engine. Such a lift system requires modification to the motor vehicle and only fits on certain model of vans. Likewise, specially modified commercial buses are built with hydraulic lifts in the front doorway thereof with similar disadvantages to the van. Such specially modified vans and particularly buses are obviously not affordable by most individuals.

Regarding modified private automobiles and vans for wheelchair access, there is a powered base which replaces the standard fixed base in full-sized Ford cars made by the Braun Corporation of Winamac, Ind. Such power base allows the front driver or passenger seat to pivot sideways and tilt downwardly such that the front edge thereof is at about the height of a wheelchair positioned adjacent to the vehicle so as to facilitate transfer therebetween. Once such transfer from the wheelchair to the car seat has been made, the power base lifts and pivots the occupant into a standard position in such car. Such system requires modifications to the vehicle, costs approximately $3,000, and only fits certain car models.

The Bruno Corporation of Oconomowoc, Wis. manufactures a powered base for use in full-sized pick-up trucks which lowers the driver or passenger from his seat by about six and one half inches from the standard position so as to facilitate transfer to and from a wheelchair therebeside. Such powered base does not allow the seat to pivot, costs approximately $2,500, and requires modifications to the vehicle.

The Bruno Corporation also manufacturers a folding seat lift system for use with full size vans and pickup trucks. Such lift system includes a pair of lift towers which install to the floor of the vehicle adjacent the outside edge of the driver's side seat. A lift bar spans between the respective towers with a pivotally attached seat which has a horizontal position extending out the vehicle doorway with the door open and a vertical position for stowage during driving with the vehicle door closed. A folding L-shaped armrest and safety bar attached to one of the towers aids in maintaining the occupant in the seat during use. This lift system presumably uses electric screw or hydraulic type lifting. Such lift system is also relatively expensive.

There is a need for a low-cost transfer system which can be used particularly in small, energy efficient automobiles and small pickup trucks which requires no modification to such vehicle for installation therein.

SUMMARY OF THE INVENTION

A folding motor vehicle entry seat for facilitating the entry and exit of a person who uses a wheelchair or other persons with physical limitations in entering and exiting a vehicle, such as from a wheelchair positioned adjacent such vehicle to a seat of such motor vehicle and vice-versa. The entry seat is completely manually operated and uses no hydraulic, motor, or other powered assist and can be manufactured to attach to the vehicle using the existing connection means such as the standard vehicle bolts and brackets which attach the vehicle seat and optionally the seat belt to the vehicle body, or other such vehicle structure (hereinafter called the vehicle body) without requiring any or only minor modification of the vehicle.

The entry seat comprises a seat means and a main frame means to which the seat means is pivotally connected. The main frame means extends generally parallel to and adjacent the side of the vehicle seat with portions thereof at front and rear ends thereof which extend laterally inwardly thereof and which uses such connection means to attach to the vehicle. The main frame means includes spaced-apart vertical guide means between which the inside edge of the seat means is positioned and to which the seat means is pivotally connected. Such pivotal connections can vertically slide in such guide means to move to a deployed position wherein the seat means is at the top of such guide means in an outwardly extending, generally horizontal position at about the height of the seating surface of the vehicle seat. The seat means is supported in such horizontal deployed position by a seat stop means of the main frame means which contacts the inside edge portion of the seat means and which supports the seat means along with the pivotal connections which contact respective upper ends of the guide means. The seat means folds to a stowed position by raising the outside edge thereof so as to pivot about the pivotal connections and to be disengaged from the seat stop means to a vertical position and then vertically lowered along the guide means to a stowed position between the guide means adjacent the outside of the vehicle seat. One or both of such front and rear portions preferably span and attach to both respective front or rear seat support brackets to prevent pivoting of such main frame assembly about such front and rear seat support brackets during use of such entry seat. Such front and rear portions can include separately bolted-on adapter brackets to adapt to particular motor vehicles, particularly to those portions spanning both seat support brackets.

The seat stop means can further comprise a pivoting brace means which extends from the lower surface of the seat means adjacent the outside edge thereof to the upper surface of the body lower doorway portion of the vehicle for additional support. Such brace means folds generally parallel to the seat means in the stowed position for compact storage thereof.

THE DRAWINGS

The best mode presently contemplated for carrying out the invention is illustrated in the accompanying drawings, in which:

FIG. 1 is a perspective view of the automobile entry seat of the invention in an unfolded position as installed at the doorway of an automobile;

FIG. 2, a top plan view to an enlarged scale of such automobile entry seat in the unfolded position showing the mounting bracketry thereof;

FIG. 3, a side elevational view taken on the line 3—3 of FIG. 2, showing the folding brace which supports the seat in the open position;

FIG. 4, a fragmentary rear end view of such automobile entry seat as installed to the seat of the automobile showing how the folding brace of the automobile entry seat rests against the lower doorway portion of the body, the folding motion thereof shown by arrows; and FIG. 5, a fragmentary rear elevational view corresponding to FIG. 4, but wherein the automobile entry seat is in a folded position and showing the door of the automobile which is closed.

DETAILED DESCRIPTION OF THE ILLUSTRATED EMBODIMENTS

Figure 1:
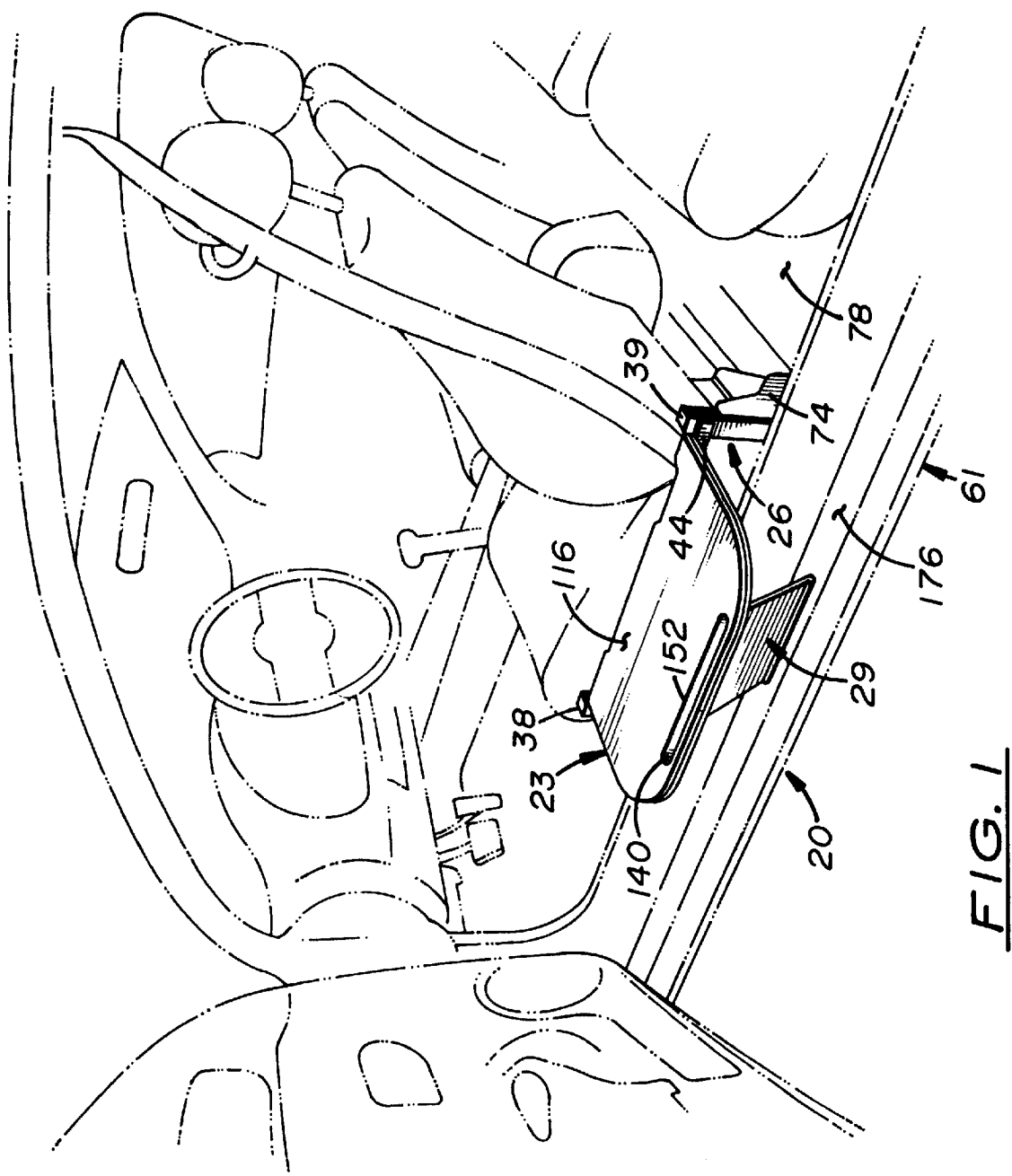
Figure 2:
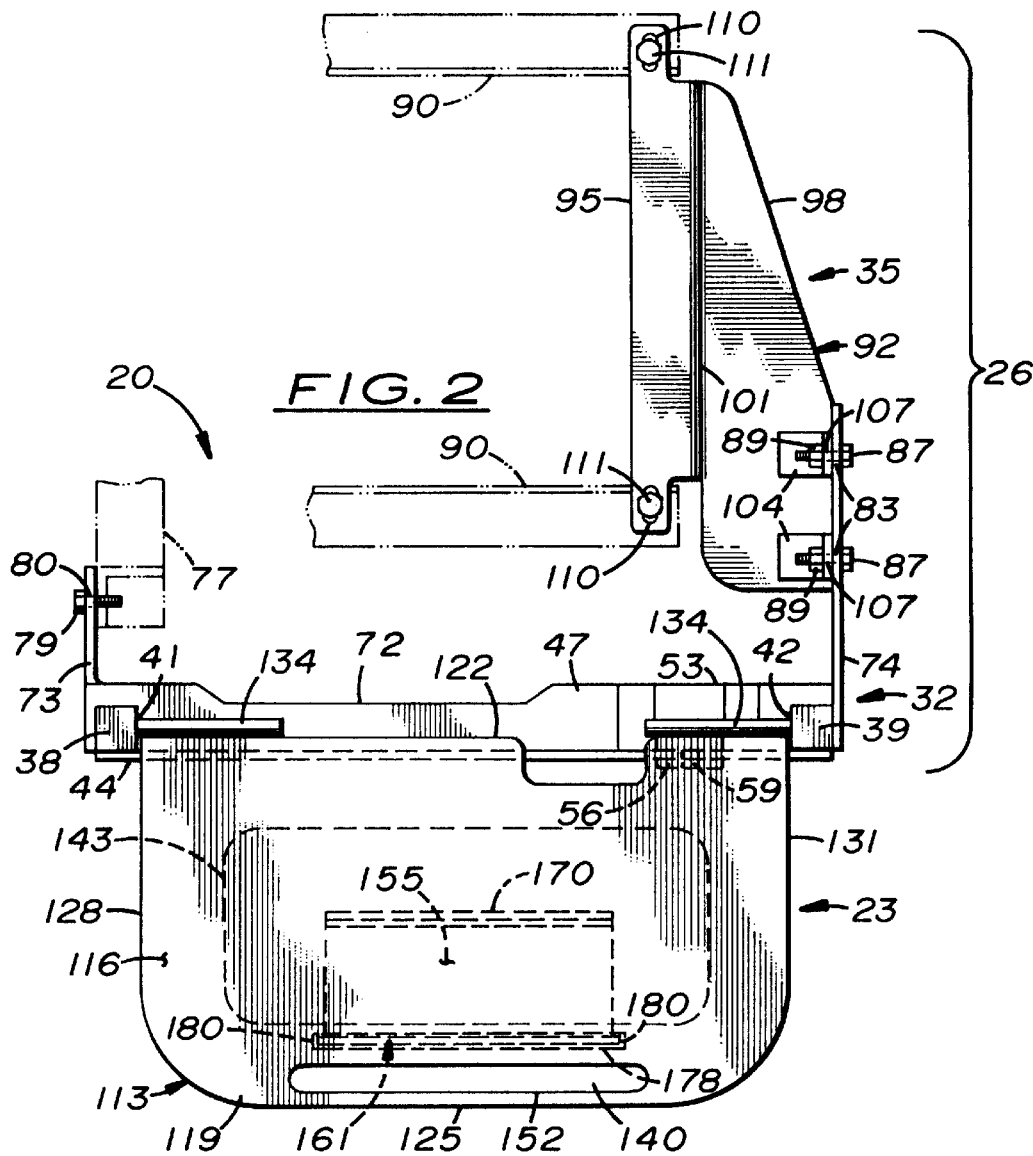
Figure 3:
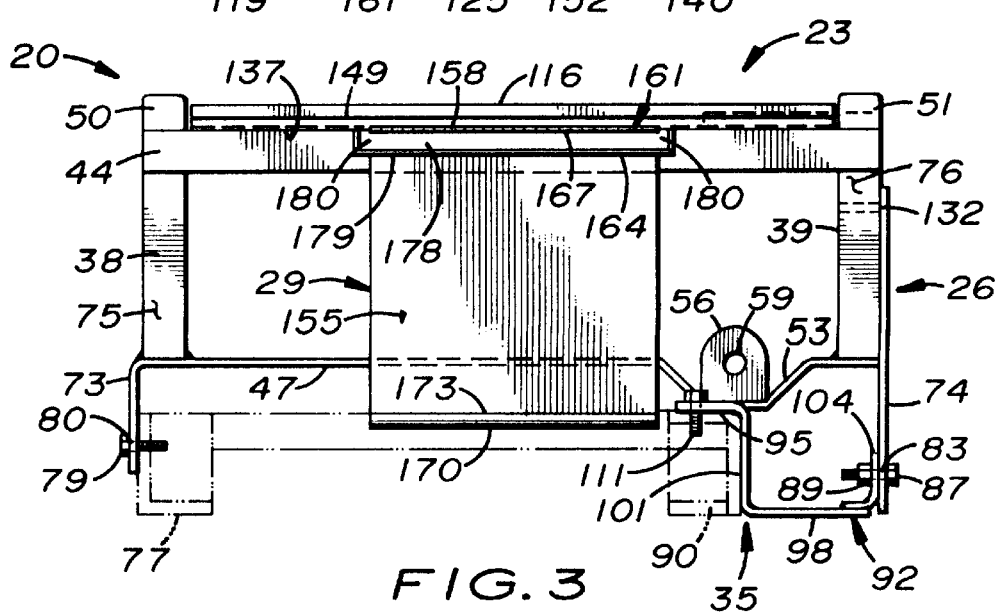
Figure 4:
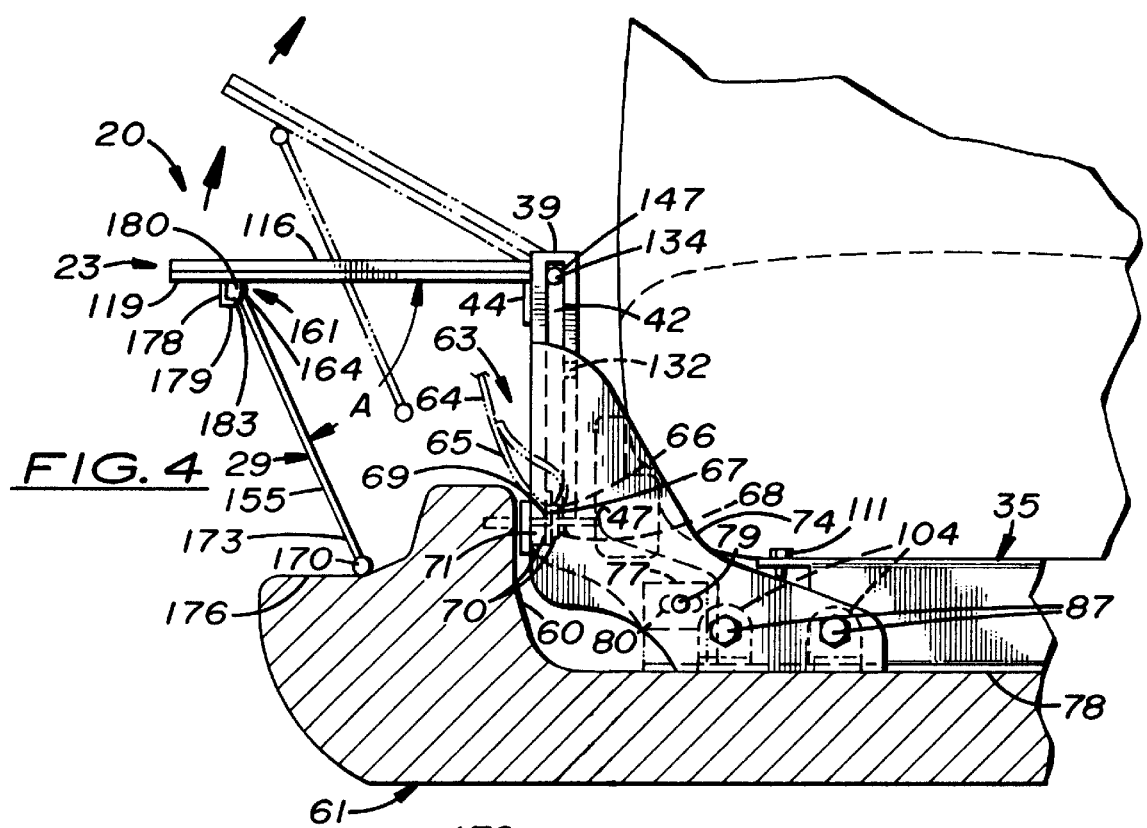
Figure 5:
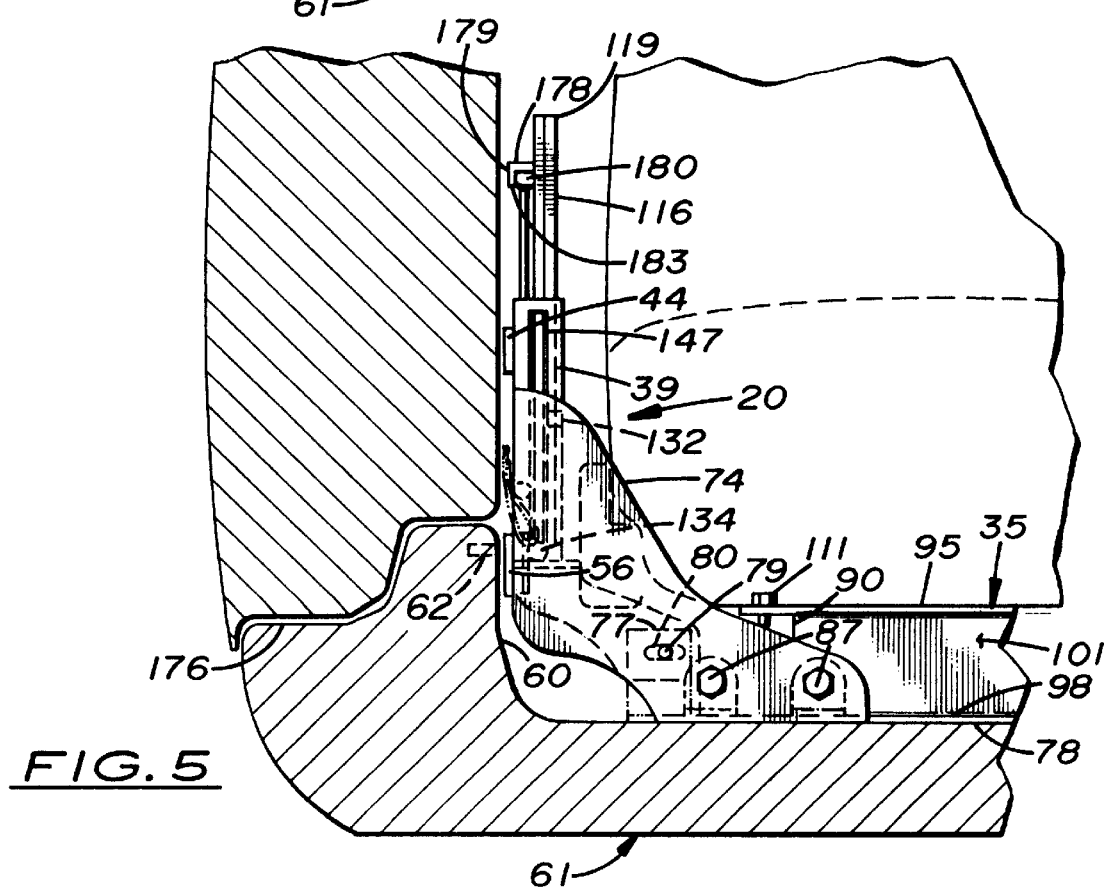

Referring to FIGS. 1 and 2 therein is shown the folding vehicle entry seat of the invention. Entry seat 20 comprises a seat means in the form of a seat assembly 23 which is pivotally attached to a main frame means in the form of main frame assembly 26 which includes a seat stop means, and a further seat stop means which includes a brace means in the form of a support brace 29.

Main frame assembly 26 comprises a main frame 32 and a bolted-on rear adapter bracket 35. Main frame 32 includes a guide means comprising a pair of upstanding, generally rectangular cross-section posts 38 and 39 having respective longitudinal slots 41 and 42 which extend therethrough for most of the length thereof. Posts 38 and 39 are connected together by means of a flat upper cross member 44 and by means of a lower cross member 47. Upper cross member 44 is affixed in a vertical position across respective top portions 50 and 51 of posts 38 and 39 and functions as a seat stop means to support and maintain seat assembly 23 in the deployed position and functions to retain seat assembly 23 against the side of the vehicle seat while the entry seat is in the stowed position. In such stowed position, entry seat 20 allows unrestricted access to the vehicle seat such as by persons not requiring assistance entering or exiting the vehicle by means of posts 38 and 39 and seat assembly 23 being below the vertical height of the seating surface of such vehicle seat. Lower cross member 47 is affixed between posts 38 and 39 in a horizontal position. Lower cross member 47 also functions as a lower stop against which seat assembly 23 rests in the stowed position. Lower cross member 47 includes a lower vertically offset portion 53. An upstanding tab 56 extends from offset portion 53 having a hole 59 therethrough. Tab 56 fits against side portion 60 of the vehicle body 61 with hole 59 thereof aligned with a threaded hole 62 in side portion 60 to which the existing vehicle seat belt loop and hardware assembly 63 is normally bolted. Assembly 63 comprises a seat belt 64 having a lower loop portion 65 which fits through a slot 66 in a lower seat belt mounting plate 67. A seat belt retaining bolt 68 extends through a hole 69 through plate 67 with a wave washer 70 on each side thereof. A flat spacer washer 71 fits over bolt 68 against tab 56 to provide clearance for plate 67 to pivot about bolt 68, which is threaded into threaded hole 62 of side portion 60 of vehicle body 61. Such bolting of tab 56 to body 61 adds structural strength to entry seat 20, making use of the vehicle's existing seat belt mounting system. Lower cross member 47 further includes one or more clearance notches 72 which provide clearance such as for a vehicle seat tilt knob, seat belt brackets, or other such obstructions (not shown) which the particular vehicle seat and seat support brackets might have. A pair of front and rear mounting plates 73 and 74, respectively, are affixed to and extend from respective posts 38 and 39. Front mounting plate 73 can be integral with lower support member 47 as shown or as a separate piece which is affixed to the respective outside surfaces 75 and 76 of posts 38 and 39. Front mounting plate 73 is of such configuration so as to bolt to the particular bracketry which supports the vehicle seat such as front vehicle seat mounting bracket 77 holding the vehicle seat base frame (not shown) to floor portion 78 of vehicle body 61 by means of a single bolt 79 which extends through a slot 80 therethrough. Front mounting plate 73 can be designed to fit the particular vehicle and can include additional bolt holes (not shown), can be bent so as to have vertically extending holes, or whatever adaptations are needed to suit the particular vehicle including being longer so as to span and connect to both front seat mounting brackets 77 or other such bracketry and the vehicle seat base frame. An adapter bracket (not shown) can also be used which bolts or otherwise attaches to front mounting plate 73 as done with rear mounting plate 74 explained subsequently. Rear mounting plate 74 includes a pair of horizontally disposed holes 83 therethrough for attachment of rear adapter bracket 35 which bolts thereto by means of bolts 87 and nuts 89. Rear mounting plate 74 can be made to fit the particular mounting needs of the vehicle seat without such adapter bracket 35. At least one of front or rear plates 73 and 74 or a bracket such as adapter bracket 35 typically must span between the seat support bracketry on both sides of the seat at the front or rear thereof such between both of front seat support brackets 77 or between a pair of rear seat support brackets 90, so as to provide sufficient support to main frame assembly 26 during use thereof.

Rear adapter bracket 35 comprises a Z-shaped plate 92 having a horizontally extending short leg 95 and a vertically extending long leg 98 connected together by a connecting leg 101. A pair of L-shaped reinforcing brackets 104 each having a hole 107 therethrough are affixed to long leg 98 and which are bolted to rear plate 74 by means of bolts 87 and nuts 89. Short leg 95 includes a pair of slots 110 therethrough. Adapter bracket 35 as shown is of such configuration as to bolt to the right and left rear vehicle seat mounting brackets 90 such as by means of a pair of bolts 111 which extend through slots 110. Rear adapter bracket 35 can be a separate piece as shown or can be integral with lower cross member 47. When installed in a vehicle, long leg 98 is closely adjacent floor portion 78 of vehicle body 61, such as against the vehicle floor carpeting (not shown) to provide support to adapter bracket 35 and main frame assembly 26.

Seat assembly 23 comprises a seat plate assembly 113 and a rubber pad or cushion 116. Seat plate assembly 113 includes a seat plate 119 having a straight inner edge 122, a radiused outer edge 125, and opposite side edges 128 and 131. A pair of hinge pins 134 affixed to a lower surface 137 of seat plate 119 extend outwardly from respective side edges 128 and 131. A horizontally disposed slot 132 in post 39 allows seat assembly 23 to be assembled to and removed from main frame assembly 26. Seat plate 119 is positioned above upper cross member 44 with hinge pins 134 extending into longitudinal slots 41 of posts 38 and 39 so as to pivot about and to vertically slide therein when seat plate 119 is in a vertical position. A handle slot 140 extends adjacent outer edge 125 to aid in gripping seat assembly 23 during use and adjacent a large central hole 143. When seat plate 119 is in the generally horizontal seat position, hinge pins 134 contact ends 146 and 147 of longitudinal slots 41 and 42, and upper cross member 44 supports lower surface 137 of seat plate 119 so as to support seat plate 119 in such horizontal seat position when a load is applied to seat plate 119 such as when someone sits thereon. Such upper cross member 44 and hinge pins 134 comprise seat stop means. Rubber cushion 116 is affixed by heating to upper surface 149 of seat plate 119 and may also be affixed by other conventional means such as adhesives or riveting. Rubber cushion 116 covers upper surface 149 including central hole 143, which central hole 143 is of such size and shape as to allows rubber cushion 116 to flex thereinto and to conform to a user's posterior so as to provide further cushioning thereof. Rubber cushion 116 includes a handle slot 152 which corresponds to handle slot 140 of seat plate 119 to allow gripping of seat assembly 23 during use. Rubber cushion 116 preferably has a slick outer surface for ease of a person sliding thereacross to and from the seat of the vehicle. Cushion 116 can likewise be made of plastic or other such material which allows such sliding.

The seat stop means can further comprise support brace 29 which comprises a flat plate 155 having a first half 158 of a piano hinge 161 affixed along the top edge 164 thereof. A second half 167 of piano hinge 161 is affixed to lower surface 137 of seat plate 119. A circular cross-section lower bumper member 170 extends the length of the lower edge 173 of plate 165 to aid in preventing damage to a lower doorway portion 176 of the body 61 against which lower bumper member 170 rests for support. A support brace stop means is preferably provided to prevent support brace 152 from opening beyond a preset angle "A" so as to fall into the proper position by gravity when moving seat assembly 23 from the stowed position to the seat position. Such support brace stop means comprises a support brace stop assembly 177 which fits partially around piano hinge 161, including an elongate rear member 178, an elongate stop member 179, and opposing end members 180 affixed to lower surface 137 of seat plate 119. Stop assembly 177 is configured such that flat plate 155 of support brace 29 contacts the free edge 183 of stop member 179 when a predetermined angle "A" is reached which angle "A" is proper to place support brace 29 against lower doorway portion 176 of vehicle body 61. The width of support brace 152 is less than the width between posts 38 so as to allow support brace 152 to fit therebetween in the stowed position. In such stowed position, brace 152 folds inwardly so as to be juxtaposed lower surface 137 of seat plate 119, with seat plate 119 and brace 152 lie inwardly of upper cross member 44 between such upper cross member 44 and the outside edge of the vehicle seat. An additional upper cross member (not shown) can be added opposite upper support member 44 to support seat plate 119 and pad 116 rather than using the outer edge of the seat.

Many variations of the transfer seat of the invention are possible while staying within the inventive concept thereof. For example, the upright posts can be eliminated and the guide means thereof added to the front and rear plates in the form of vertical slots in which the pins of the seat assembly can slide. Many or all of the individual component parts of the main frame assembly can be combined together in one or more pieces of bent, stamped, or otherwise formed sheet metal. The rubber cushion can be made thicker or out of other materials such as a foam filled cloth cover. The support brace can comprise a folding, locking arm such as used on step ladders and extension leafs of dining tables. Likewise, the transfer seat can be designed to attach to any existing bracketry, bolting locations, or other such support points which ultimately (i.e. directly or through bracketry or other such mountings) firmly connect the entry seat to the vehicle body, frame, floor, or other such structure to which the vehicle seats are originally ultimately firmly connected to. While utilizing existing bolts and bolting locations is preferred, special bolts such as of a longer or shorter length, or of other desired configuration can be used. Likewise, the transfer seat can be secured using other such conventional means which may make sense for the particular vehicle configuration such as on future vehicle models which may not utilize bolts but which may have other such existing means to mount the transfer seat without modifications to the vehicle. However, minor modifications of the vehicle are also contemplated within the inventive concept such as drilling and tapping holes in the vehicle body, brackets, or other such structure for mounting of the transfer seat, particularly where the existing bolts and bolting locations do not readily lend themselves to mounting of the transfer seat. The use of plastics and metal reinforced plastics is likewise contemplated within the inventive concept.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A folding motor vehicle entry seat for persons who use wheelchairs and others who have physical limitations, which vehicle entry seat utilizes existing vehicle connecting means used to mount a seat of the vehicle to the body of the vehicle, which vehicle entry seat mounts adjacent to the vehicle seat above the lower doorway portion of the vehicle body, comprising:

a main frame means which extends generally adjacent to the vehicle seat, which main frame means extends laterally inwardly of the vehicle at respective front and rear ends of such main frame to attach to the connecting means, and which includes a seat stop means attached thereto;

a seat means which is pivotally connected to said main frame means at an inside edge of said seat means adjacent the vehicle seat, said seat means having a deployed position with the vehicle door open extending generally horizontally, laterally of the vehicle over the lower doorway portion of the vehicle body, wherein said seat stop means contacts and retains said seat means in such deployed position, and wherein said seat means includes a stowed position wherein said seat means pivots to a generally vertical position adjacent the vehicle seat allowing the vehicle door to close.

2. A motor vehicle entry seat according to claim 1, wherein the main frame means includes guide means such that the inside edge of the seat means moves from the stowed position vertically upwardly along said guide means to the deployed position wherein the seat stop means vertically retains said seat means in said deployed position and wherein to return said seat to the stowed position said seat means is moved to a generally vertical position and said seat means is moved vertically downwardly along said guide means to the stowed position so as to fit in such stowed position adjacent the vehicle seat.

3. A motor vehicle entry seat according to claim 2, wherein:

the main frame means includes front and rear mounting plates which extend laterally inwardly of the vehicle at respective front and rear ends of such main frame means so as to connect to the brackets, the guide means comprises a pair of vertically extending slots in opposite sides of said main frame means, and the seat stop means comprises a seat stop member adjacent the top of said main frame means; and the seat means comprises a plate assembly which includes a plate of such size as to generally accommodate the posterior end of a user thereof and a pair of hinge pins which are affixed to the bottom of said plate adjacent an inside edge thereof and which extend outwardly from respective side edges thereof, said pins which extend into said longitudinally extending slots of said main frame means and which vertically slide therein.

4. A motor vehicle entry seat according to claim 3, wherein the main frame means further comprises a pair of upright posts of generally rectangular cross-section at opposite sides thereof which include the longitudinally extending slots, the front and rear mounting plates being affixed thereto, said posts being interconnected, at respective faces thereof which face outwardly from the vehicle, by an upper cross member comprising the seat stop member and by a lower cross member, said upper cross member which laterally retains the seat plate against the vehicle seat and which lower cross member vertically retains said seat plate in the stowed position.

5. A motor vehicle entry seat according to claim 1, wherein the seat stop means further includes a brace means which extends between the seat means and the lower doorway portion of the vehicle body in the deployed position to further support said seat means in such deployed position and which brace means pivots to a position generally adjacent to and parallel to the seat means in the stowed position of said seat means.

6. A motor vehicle entry seat according to claim 5, wherein the main frame means includes guide means such that the inside edge of the seat means moves from the stowed position vertically upwardly along said guide means to the deployed position wherein the seat stop means vertically retains said seat means in said deployed position and wherein to return said seat to the stowed position said seat means is moved to a generally vertical position and said seat means is moved vertically downwardly along said guide means to the stowed position so as to fit in such stowed position adjacent the vehicle seat.

7. A motor vehicle entry seat according to claim 6, wherein:

the main frame means includes front and rear mounting plates which extend laterally inwardly of the vehicle at respective front and rear ends of such main frame means so as to connect to the brackets, the guide means comprises a pair of vertically extending slots in opposite sides of said main frame means, and the seat stop means comprises a seat stop member adjacent the top of said main frame means; and the seat means comprises a plate assembly which includes a plate of such size as to generally accommodate the posterior end of a user thereof and a pair of hinge pins which are affixed to the bottom of said plate adjacent an inside edge thereof and which extend outwardly from respective side edges thereof, said pins which extend into said longitudinally extending slots of said main frame means and which vertically slide therein.

8. A motor vehicle entry seat according to claim 7, wherein the main frame means further comprises a pair of upright posts of generally rectangular cross-section at opposite sides thereof which include the longitudinally extending slots, the front and rear mounting plates being affixed thereto, said posts being interconnected, at respective faces thereof which face outwardly from the vehicle, by an upper cross member comprising the seat stop member and by a lower cross member, said upper cross member which laterally retains the seat plate against the vehicle seat and which lower cross member vertically retains said seat plate in the stowed position.

9. A motor vehicle entry seat according to claim 8, wherein the main frame means includes an adapter bracket which bolts to one of the mounting plates and which attaches to the connecting means at both sides of the vehicle seat.

10. A motor vehicle entry seat according to claim 9, wherein the adapter bracket bolts to the rear mounting plate.

11. A motor vehicle entry seat according to claim 7, wherein the seat means further comprises a cushion which is attached to the upper surface of the seat plate.

12. A motor vehicle entry seat according to claim 11, wherein:

there is a central hole through the seat plate; and the cushion comprises a sheet of flexible material of such size as to completely cover said central hole, such central hole which allows said sheet to be depressed slightly thereinto to provide additional cushioning effect.

13. A motor vehicle entry seat according to claim 11, wherein:

there is an elongate slot which extends through the portion of the seat plate adjacent the outer edge of thereof; and the cushion includes an elongate slot of the same size and position as that of the seat plate such that said seat plate with cushion can be gripped through said elongate slot for operation thereof.

14. A motor vehicle entry seat according to claim 7, wherein the brace means comprises a member which is pivotally connected to the lower side of the seat plate generally parallel to and toward the outside edge thereof.

15. A motor vehicle entry seat according to claim 14, wherein the brace means includes a brace stop means which prohibits said brace means from moving beyond a predetermined included angle between the seat plate and said brace means at which said brace means correctly contacts the lower doorway portion of the vehicle body.

16. A motor vehicle entry seat according to claim 14, wherein:

the brace means comprises a brace plate which is pivotally connected to the lower side of the seat plate generally parallel to and toward the outside edge thereof by means of a hinge; and a brace stop means connected to said seat plate prohibits said brace plate from moving beyond a predetermined included angle between the seat plate and said brace plate at which said brace means correctly contacts the lower doorway portion of the vehicle body.

17. A motor vehicle entry seat according to claim 14, wherein the main frame means further comprises a pair of upright posts of generally rectangular cross-section at opposite sides thereof which include the longitudinally extending slots, the front and rear mounting plates being affixed thereto, said posts being interconnected, at respective faces thereof which face outwardly from the vehicle, by an upper cross member comprising the seat stop member and by a lower cross member, said upper cross member which laterally retains the seat plate against the vehicle seat and which lower cross member vertically retains said seat plate in the stowed position.

18. A motor vehicle entry seat according to claim 17, wherein the brace means includes a brace stop means which prohibits said brace means from moving beyond a predetermined included angle between the seat plate and said brace means at which said brace means correctly contacts the lower doorway portion of the vehicle body.

19. A motor vehicle entry seat according to claim 17, wherein:

the brace means comprises a brace plate which is pivotally connected to the lower side of the seat plate generally parallel to and toward the outside edge thereof by means of a hinge; and a brace stop means connected to said seat plate prohibits said brace plate from moving beyond a predetermined included angle between the seat plate and said brace plate at which said brace means correctly contacts the lower doorway portion of the vehicle body.

20. A motor vehicle entry seat according to claim 1, wherein the frame means is adapted to further attach to the body of the vehicle by means of utilizing an existing seat belt mounting bolt and threaded mounting hole of the vehicle.

* * * * *